US006615945B2

(12) United States Patent
Minami et al.

(10) Patent No.: US 6,615,945 B2
(45) Date of Patent: Sep. 9, 2003

(54) MOTORCYCLE HAVING A HOUSING BOX AND STORAGE SPACE ARRANGED TO INCREASE THE CAPACITY OF THE INTAKE SYSTEM

(75) Inventors: Kazutaka Minami, Saitama (JP); Mitsuru Kojima, Saitama (JP); Yuichi Moriyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/946,527

(22) Filed: Sep. 6, 2001

(65) Prior Publication Data

US 2002/0027033 A1 Mar. 7, 2002

(30) Foreign Application Priority Data

Sep. 6, 2000 (JP) ........................................ 2000-270745

(51) Int. Cl.[7] ................................................ B62M 7/00
(52) U.S. Cl. ....................................................... 180/219
(58) Field of Search ........................... 180/219; 224/413

(56) References Cited

U.S. PATENT DOCUMENTS 4,469,189 A * 9/1984 Minami et al. ............. 180/219
4,475,617 A * 10/1984 Minami et al. ............. 180/219
5,152,361 A * 10/1992 Hasegawa et al. .......... 180/230
6,290,016 B1 * 9/2001 Umeoka ...................... 180/219
6,349,785 B1 * 2/2002 Ohmika et al. ............. 180/227
6,360,839 B1 * 3/2002 Urano et al. ................ 180/229
6,513,613 B2 * 2/2003 Suzuki et al. ............... 180/227

FOREIGN PATENT DOCUMENTS

JP B2-2525573 5/1996

* cited by examiner

*Primary Examiner*—Lesley D. Morris
*Assistant Examiner*—Paul Royal, Jr.
(74) *Attorney, Agent, or Firm*—Birch, Stewart, Kolasch & Birch, LLP

(57) ABSTRACT

A motorcycle having a housing box and storage space arranged to increase the capacity of the intake system. In a motorcycle, a crank case, an engine, including a cylinder that extends forwardly from the crank case, and a housing box are arranged under a seat. An intake passage extends rearwardly from above the cylinder. An intake port of the intake passage is connected to an air chamber, and an intake port of the air chamber is connected to an air cleaner through a communication path. The air chamber is arranged upwardly of the crank case. The housing box is arranged rearwardly of the air chamber and the air cleaner is arranged to the side of the housing box.

14 Claims, 5 Drawing Sheets

MOTORCYCLE HAVING A HOUSING BOX AND STORAGE SPACE ARRANGED TO INCREASE THE CAPACITY OF THE INTAKE SYSTEM

CROSS-REFERENCE TO RELATED APPLICATIONS

The present application claims priority under 35 USC 119 to Japanese Patent Application No. 2000-270745 filed on Sep. 6, 2000, the entire contents thereof are hereby incorporated by reference.

BACKGROUND OF THE INVENTION

1. Field of the Invention

The present invention is directed to the arrangement of an engine intake system and a housing box of a motorcycle.

2. Description of Background Art

In some motorcycles, an engine and a housing box are arranged under a seat, for example, as set forth in a scooter type motorcycle. For a motorcycle of this type, there has been known, for example, Japanese Patent No. 2525573 publication entitled "Air Cleaner Case for a Scooter Type Vehicle" (hereinafter referred to as "prior art").

In the aforementioned prior art, as shown in FIG. 2 of Japanese Patent No. 2525573, an air cleaner case 29 is arranged at the rear of an engine body 25 (the numerals used in this description are the numerals as set forth in the publication), chambers 41 and 42 are arranged in front of the engine body 25. The chamber 42 is connected to the air cleaner case 29 through a connecting tube 37. The chamber 41 is provided integral with the chamber 42, and an intake port of the engine body 25 is connected to the chamber 41 through a carburetor 27.

Further, in the aforementioned prior art, as shown in FIG. 1 of the publication, a power unit 13 includes a power transmission device incorporated in the engine that is mounted on a body frame 2 under a tandem seat 24 so as to be able to swing up and down.

In the aforementioned prior art, preferably, the engine intake systems such as the air cleaner case 29 and the chambers 41 and 42 are of a relatively large capacity in order to sufficiently exhibit the performance of the engine body 25.

In a scooter type motorcycle as set forth in the aforementioned prior art, a housing box, not shown, is often arranged under the tandem seat 24. Preferably, the housing box has a large capacity. However, the space for arranging things under the seat is limited. When the large capacity engine intake systems and the large capacity housing box are arranged under the seat, the tandem seat 24 is unavoidably raised in order to provide the space for arranging the elements. The tandem seat 24 cannot be raised or lowered simply due to the foot-landing performance.

SUMMARY AND OBJECTS OF THE INVENTION

It is therefore an object of the present invention to provide a technique capable of increasing the capacity of an engine intake system or the capacity of a housing box without increasing the height of the seat.

For achieving the aforementioned object, there is provided a motorcycle in which a crank case, an engine with a cylinder extended forwardly from the crank case, and a housing box are arranged under a seat. An intake passage extends rearwardly from an upper part of the cylinder. An air chamber is arranged above the crank case and is connected to an intake port of the intake passage. The housing box is arranged rearwardly of the air chamber. An air cleaner is arranged sideways of the housing box, and the air cleaner and the air chamber are connected by a communication path.

The cylinder extends forwardly from the crank case, a space above the crank case can be secured. The air chamber, the housing box and the air cleaner are arranged in the surplus space. The housing box is arranged to be rearwardly of the air chamber. The air cleaner is arranged in the surplus space to be sideways of the housing box. Further, the surplus space above the cylinder is utilized to extend the intake passage rearwardly from above the cylinder, and the air chamber is connected to the intake port of the intake passage. The air cleaner is connected to the air chamber by the communication path.

As described above, the engine intake system including the air cleaner, the communication path, the air chamber and the intake passage, and the housing box can be arranged effectively making use of the surplus space under the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be described hereinafter with reference to the accompanying drawings. With respect to "front," "rear," "left," "right," "upper," and "lower," Fr, Rr, L, R, and CL indicate front side, rear side, left side, right side, and body center (width center), respectively, in accordance with the direction as viewed from a rider.

Figure 1:
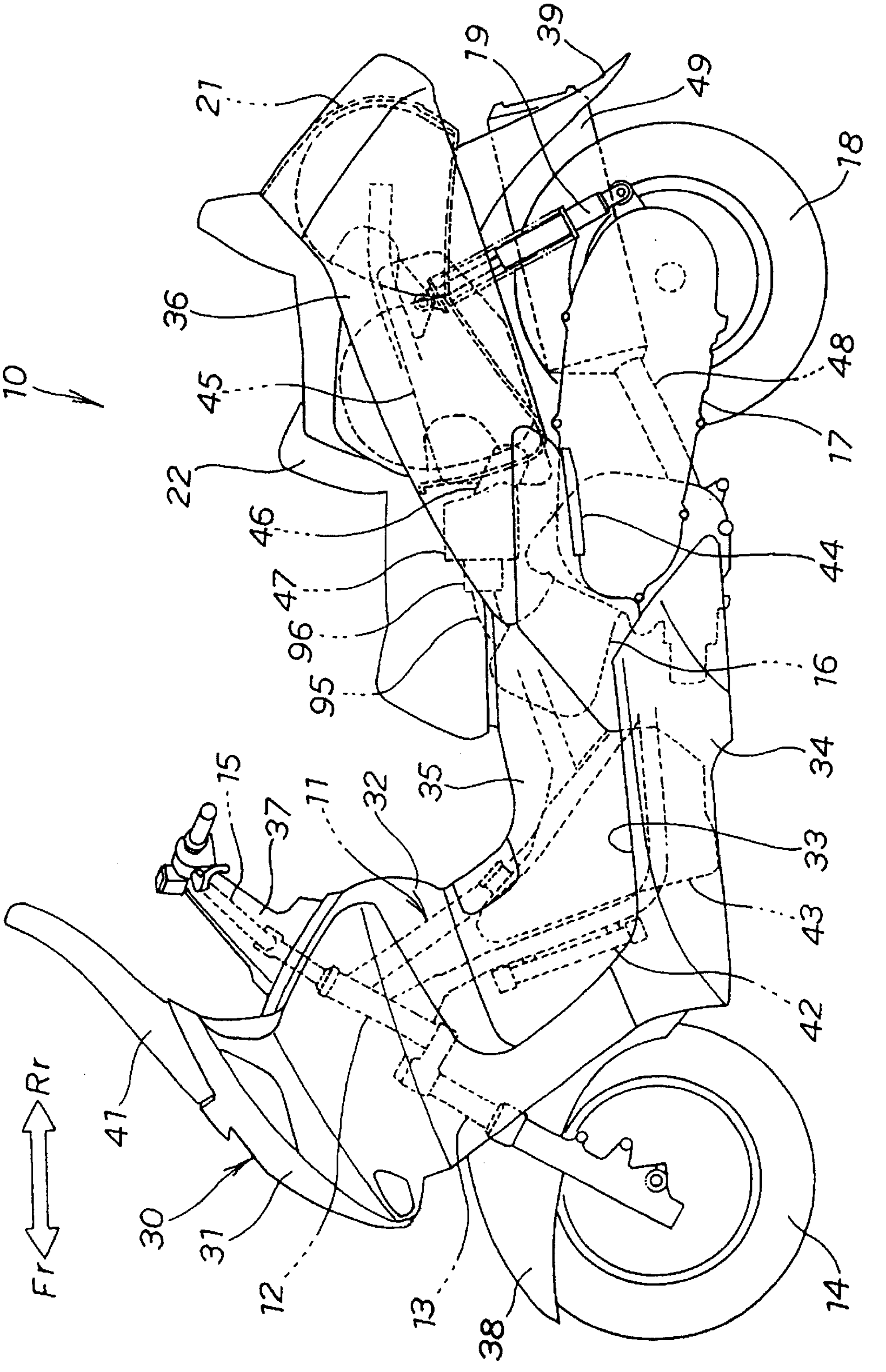
FIG. 1 is a left side view of a motorcycle according to the present invention.

FIG. 1 is a left side view of a motorcycle according to the present invention. A motorcycle 10 is a scooter type motorcycle principally including a body frame 11, a front fork 13 mounted on a head pipe 12 of the body frame 11. A front wheel 14 is mounted on the front fork 13. A handlebar 15 is connected of the front fork 13. An engine 16 is mounted on the rear portion of the body frame 11. A power transmission mechanism 17 is mounted to swing up and down on the engine 16. A rear wheel 18 is mounted on the power transmission mechanism 17. A rear shock absorber 19 is connected to a rear portion of the power transmission mechanism 17 for suspending the power transmission mechanism relative to the body frame 11. A housing box 21 is mounted on the rear upper portion of the body frame 11. A seat 22 is arranged on the housing box 21 and is mounted to be opened and closed. The seat 22 is a tandem seat.

The motorcycle 10 includes the body frame 11 that is covered with a body cover 30. The body cover 30 includes a front cover 31 covering the front part of the head pipe 12. An inner cover 32 covers the rear part of the front cover 31. Left and right floor steps 33, on which the feet of a rider are positioned and left and right floor skirts 34 that extending downwardly are provided from the outer edge of the floor steps 33. A center cover 35 extends rearwardly from the inner cover 32 to cover the longitudinal center of the body frame 11. A rear cover 36 extends rearwardly from the center cover 35 to cover the rear part of the body frame 11.

As illustrated in FIG. 1, a handlebar cover 37; a front fender 38; a rear fender 39; a window screen 41; a radiator 42 for cooling an engine; a fuel tank 43; a step 44 for an occupant; an air cleaner 45; a connecting tube 46; an air chamber 47; an exhaust pipe 48 for an engine; and a muffler 49 for exhaust are mounted relative to the body frame 11.

Figure 2:
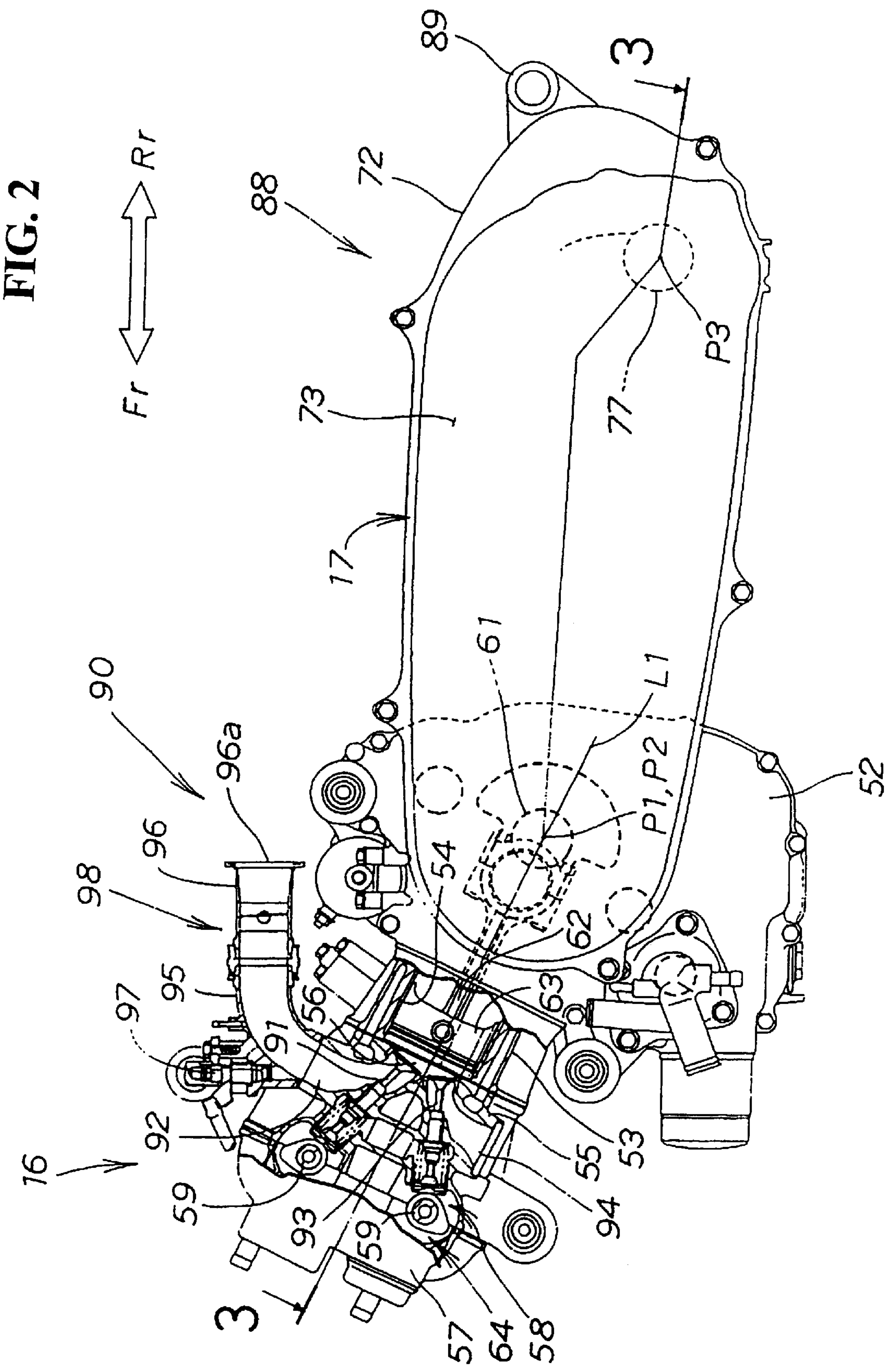
FIG. 2 is a left side view of an engine and a power transmission mechanism according to the present invention.

FIG. 2 is a left side view of the engine and the power transmission mechanism according to the present invention. The engine 16 is a 4-cycle 2-cylinder type water cooling engine having a cylinder 54 extending forwardly from a crank case 52. An axis L1 of the cylinder 54 is illustrated in FIG. 2.

Figure 3:
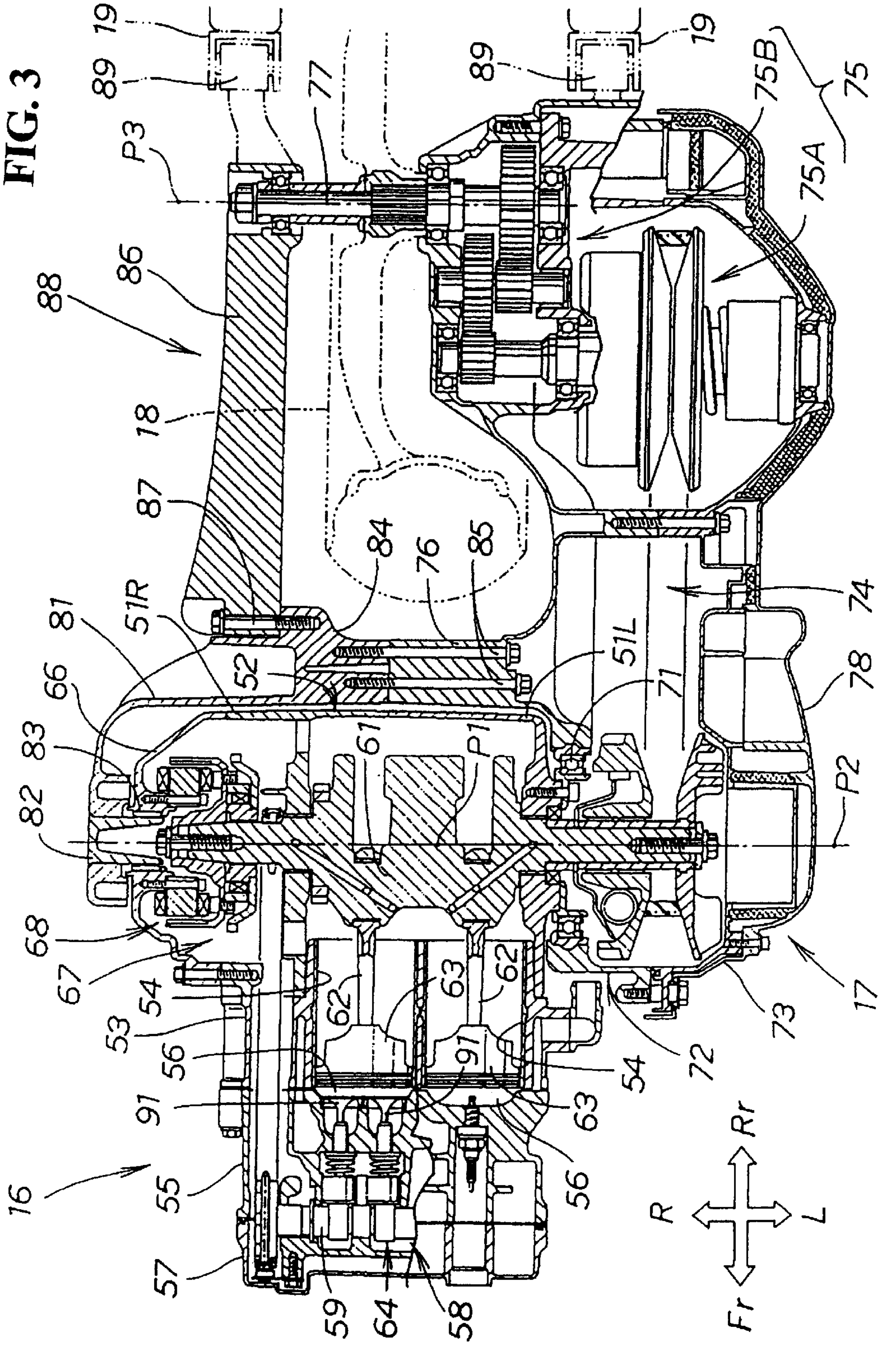
FIG. 3 is a sectional view taken on line 3—3 of FIG. 2.

FIG. 3 is a sectional view taken along line 3—3 of FIG. 2. A case portion of the engine 16 comprises a crank case 52 having left and right case halves 51L and 51R connected by a bolt. A cylinder block 53 is connected by a bolt to the front part of the crank case 52. The two left and right cylinders 54 and 54 are provided within the cylinder block 53. A cylinder head 55 is connected by a bolt to the front part of the cylinder block 53. Combustion chambers 56 and 56 are formed in the cylinder head 55. A head cover 57 is connected by a bolt to the front part of the cylinder head 55, and a valve gear chamber 58 is formed between the cylinder head 55 and the head cover 57.

The engine 16 includes a crank shaft 61 mounted rotatably on the crank case 52 and extending to the left and right. Cylinders 54 and 54 are connected to the crank shaft 61 through connecting rods 62 and 62. Pistons 63 and 63 reciprocate within the cylinders 54 and 54, respectively. A valve gear mechanism 64 is housed in the valve gear chamber 58.

A generator cover 66 is connected by a bolt to the right side part of the right case half body 51R to form a generator housing chamber 67 between the right case half body 51R and the generator cover 66 to house the generator 68 in the generator housing chamber 67. The generator 68 is connected to the right side portion of the crank shaft 61.

Since the generator cover 66 is secured to the crank case 52, the generator cover 66 is a part of the crank case 52 in the present invention.

The power transmission mechanism 17 includes a transmission mechanism case 72 having the front portion mounted so as to swing up and down on the left case half body 51L through a bearing 71 and extending rearwardly. A case cover 73 is provided for closing a side opening of the transmission mechanism case 72. A transmission mechanism housing chamber 74 is formed between the transmission mechanism case 72 and the case cover 73. A transmission mechanism 75 is housed in the transmission mechanism housing chamber 74. The transmission mechanism case 72 is formed with a boss portion 76 projecting on the width center side from the longitudinal halfway.

The transmission mechanism 75 is a combined structure of a belt type variable transmission mechanism 75A connected to the crank shaft 61 and a gear mechanism 75B connected to the belt type variable transmission mechanism 75A. A rear wheel axle 77 is connected to the output side of the gear mechanism 75B. The rear wheel axle 77 is supported for rotation. A cover 78 is provided on the transmission mechanism 75.

On the other hand, the generator cover 66 includes a front arm 81 mounted so as to be swing up and down. More specifically, a support shaft 82 is provided integrally on the front part of the front arm 81, and the support shaft 82 is supported rotatably on the generator cover 66 through a bearing 83.

The front arm 81 extends rearwardly. A boss portion 84 projects on the width center side along the rear part of the crank case 52 from the rear end thereof. The boss portion 76 of the transmission mechanism case 72 is connected by bolts 85 and 85 to the boss part 84. Further, the front arm 81 has a rear arm 86 connected by a bolt 87. The rear arm 86 extends rearwardly, and the rear wheel axle 77 is supported rotatably by the rear end part thereof.

The combined structure of the transmission mechanism case 72 and the front and rear arms 81 and 86 as described above forms a rear fork 88 having a generally H-shape as viewed from a plane. Accordingly, the front part of the rear fork 88 supporting the rear wheel 18 through the rear wheel axle 77 can be mounted so as to swing up and down on the crank case 52. The rear fork 88 coincides with a center P1 of the crank shaft 61 and with a swing center P2. P3 indicates a center of the rear wheel axle 77.

FIG. 3 further shows that on the rear end of the transmission mechanism case 72 and on the rear end of the rear arm 86 are provided brackets 89 and 89, respectively, for connecting lower parts of left and right rear shock absorber units 19 and 19.

Referring again to FIG. 2, the cylinder head 55 has an intake port 92 provided with an intake valve 91 continuous to a combustion chamber 56 and an exhaust port 94 provided with an exhaust valve 93 continuous to the combustion chamber 56 that is formed integrally therewith. When the engine 16 is viewed sideways, the intake port 92 opens upwardly, and the exhaust port 94 opens downwardly.

An inlet pipe 95 is connected to the intake port 92 and extends rearwardly of the cylinder head 55. A throttle valve 96 is connected to the rear end (upstream side) thereof. The upstream end of the throttle valve 96 is directed rearwardly. The inlet pipe 95 has a fuel injection device (injector) 97 for injecting fuel towards the intake valve 91 mounted thereon.

The combined structure of the intake port 92, the inlet pipe 95 and the throttle valve 96, as described above, forms an intake passage 98. In other words, the intake passage 98 extends rearwardly from above the cylinder 54, and the intake port of the intake passage 98 is directed rearwardly. Cam shafts 59 and 59 are provided in relationship with the valve gear mechanism 64.

Figure 4:
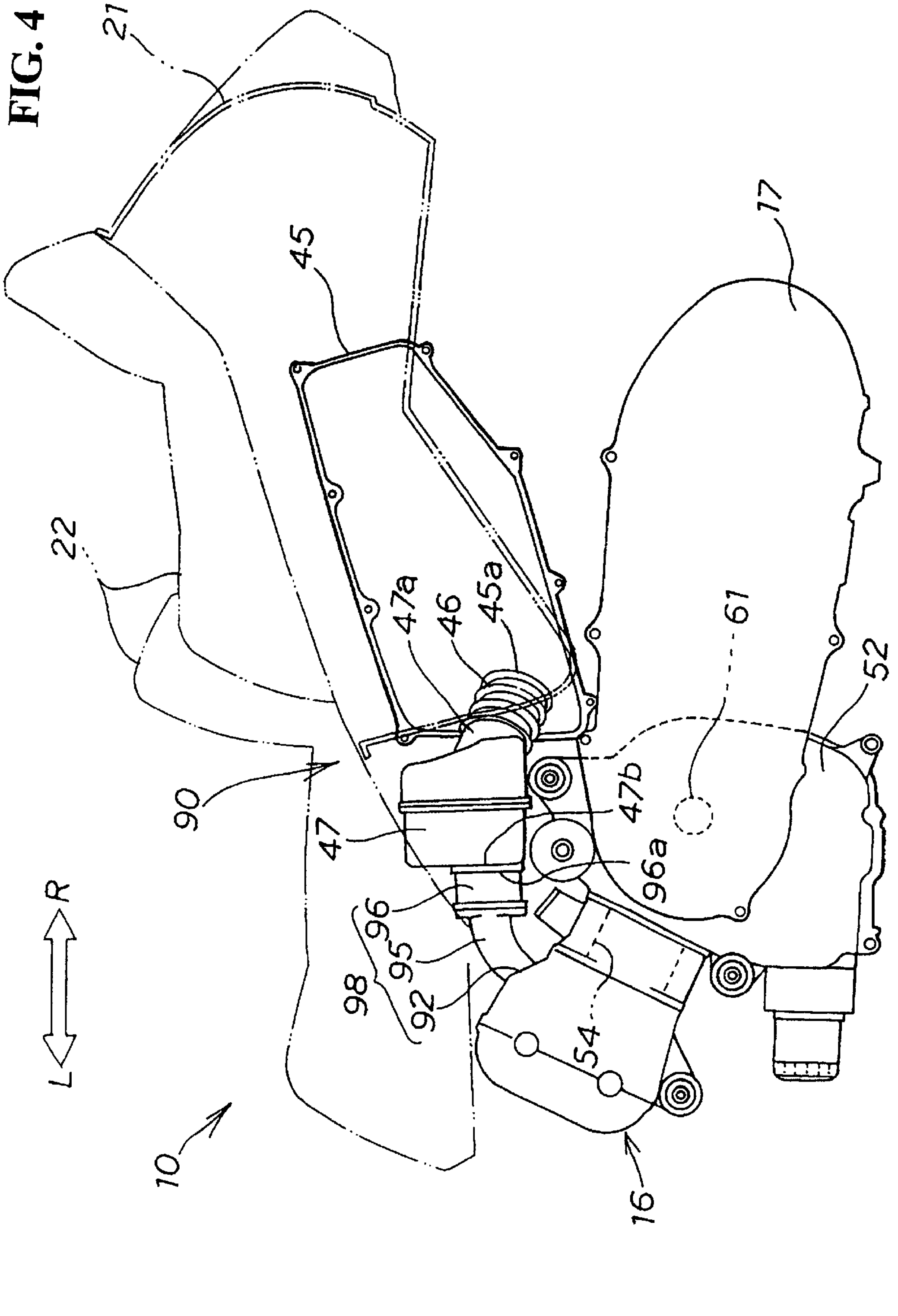
FIG. 4 is a left side view of an engine and an intake system of an engine according to the present invention.

FIG. 4 is a left side view of the engine and the intake system of the engine showing that the engine 16 and the housing box 21 are arranged under the seat 22, and that the air chamber 47 is arranged upwardly of the crank case 52.

The intake system 90 of the engine 16 (hereinafter referred to as "engine intake system 90") includes an intake port 47*a* of the air chamber 47 that is connected to an outlet 45*a* of the air cleaner 45 through the connecting tube 46 as a communication path. An upstream end 96*a* of the throttle valve 96, that is, an intake port of the intake passage 98, is connected to an outlet 47*b* of the air chamber 47 so as to introduce outside air into the combustion chambers 56 and 56 (see FIG. 2).

Figure 5:
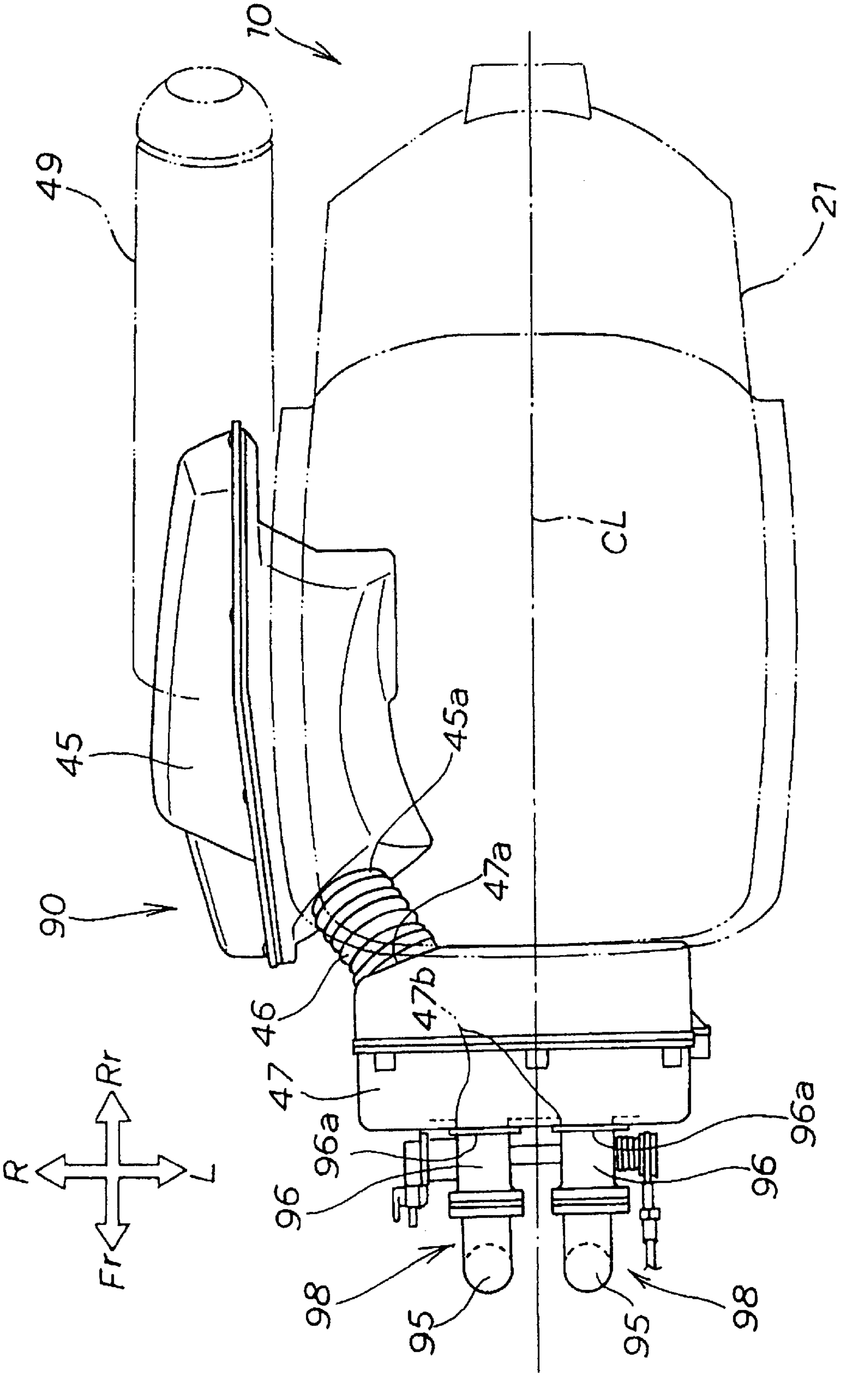
FIG. 5 is a plan view of an intake system of an engine and a housing box according to the present invention.

FIG. 5 is a plan view of the intake system of the engine and the housing box according to the present invention showing that the housing box 21 is arranged at the rear of the air chamber 47, and the air cleaner 45 is arranged to the right and sideways of the housing box 21.

The air chamber 47 is an air chamber for evenly distributing air from the air cleaner 45 to the two combustion chambers 56 and 56 (see FIG. 3) through the two left and right intake passages 98 and 98 that are branched.

Air introduced from the air cleaner 45 by intake negative pressure of the engine enters the combustion chambers 56 and 56 of the engine 16 as shown in FIG. 3 through the channel of the connecting tube 46, the air chamber 47, the throttle valves 96, 96 and the inlet pipes 95, 95.

In summary, the present invention includes, as shown in FIGS. 4 and 5, (1) the cylinder 54 that extends forwardly from the crank case 52 to thereby provide a space above the crank case 52 and below the seat 22 with the air chamber 47 being arranged in the surplus space; (2) the housing box 21 is arranged in the surplus space rearwardly of the air chamber 47 and downwardly of the seat 22; (3) the air cleaner 45 is arranged in the surplus space to the side of the housing box 21 and downwardly of the seat 22; (4) the intake passage 98 extends rearwardly from above the cylinder 54 making use of the surplus space formed upwardly of the cylinder 54 and downwardly of the seat 22, and the outlet 47*b* of the air chamber 47 is connected to the intake port 96*a* of the intake passage 98; and (5) as shown in FIG. 5, the air cleaner 45 and the air chamber 47 are connected by the connecting tube 46 to be taken around so as to make a detour to the front comer of the housing box 21.

In this manner, the housing box 21 and the engine intake system 90 can be easily arranged to make effective use of the surplus space under the seat 22. Therefore, the housing box 21 and the engine intake system 90 can be arranged at the optimum position so that they do not interfered with each other.

Accordingly, the capacity of the engine intake system 90 that is necessary for exhibiting the performance of the engine 16 can be increased sufficiently. Further, the capacity of the housing box 21 can also be increased. Moreover, the height of the seat 22 need not be raised. Thus, the mounting and demounting of an occupant from the motorcycle is facilitated by maintaining the height of the seat 22.

It is noted in the above-described embodiment of the present invention that the motorcycle 10 is not limited to the scooter type motorcycle.

Further, while in the above-described embodiment, the engine 16 is secured to the body frame 11 (vehicle body), the present invention can also be applied to a unit swing type motorcycle 10 (vehicle) in which the engine 16 and the power transmission mechanism 17 (power transmission system) are constituted integrally and supported on the body frame 11 so as to swing up and down.

The present invention exhibits the following effect by the provision of the aforementioned structure.

According to the present invention, the cylinder extends forwardly from the crank case whereby the air chamber is arranged in the space formed upwardly of the crank case. The housing box is arranged in the surplus space rearwardly of the air chamber. The air cleaner is arranged in the surplus space to the side of the housing box. In addition, the intake passage extends rearwardly from above the cylinder making use of the surplus space upwardly of the cylinder. The air chamber is connected to the intake port of the intake passage, and the air cleaner is connected to the air chamber by the communication path. As described, the engine intake system including the air cleaner, the communication path, the air chamber and the intake passage and the housing box can be arranged to make effective use of the surplus space under the seat.

Therefore, the engine intake system 90 and the housing box 21 can be arranged at the optimum position so that they do not interfered with each other. Accordingly, the capacity of the engine intake system as well as the capacity of the housing box can be increased without raising the height of the seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage space for a motorcycle in which a crank case, an engine with a cylinder extending forwardly from the crank case, and a housing box are arranged under a seat comprising:

an intake passage extending rearwardly from an upper portion of said cylinder;

an air chamber arranged above said crank case and being connected to an intake port of said intake passage;

said housing box arranged rearwardly of said air chamber;

an air cleaner arranged to a side of said housing box; and said air cleaner and said air chamber are connected by a communication path.

2. The storage space for a motorcycle according to claim 1, wherein said housing box is formed in a surplus space above the crank case and below the seat.

3. The storage space for a motorcycle according to claim 2, wherein said air chamber is formed in said surplus space.

4. The storage space for a motorcycle according to claim 3, wherein said intake passage extends into said surplus space and is connected to said air chamber.

5. The storage space for a motorcycle according to claim 2, wherein the air cleaner is formed in said surplus space below said seat.

6. The storage space for a motorcycle according to claim 1, wherein the positioning of the cylinder of the engine to extend forwardly enlarges the space below the seat for increasing the size of said housing box.

7. The storage space for a motorcycle according to claim 1, wherein said intake passage includes an intake port, an inlet pipe and a throttle valve extending rearwardly from the cylinder of the engine.

8. A storage space for a motorcycle comprising:

a frame;

an engine mounted relative to said frame and including at least one cylinder extending forwardly therefrom;

a space formed above said engine and under said seat;

a housing box being arranged in said space;

an intake passage extending rearwardly from an upper portion of said cylinder;

an air chamber arranged above said engine and being connected to an intake port of said intake passage;

said housing box arranged rearwardly of said air chamber;

an air cleaner arranged to a side of said housing box; and said air cleaner and said air chamber are connected by a communication path.

9. The storage space for a motorcycle according to claim 8, wherein said housing box extends within said space as an enlarged box disposed below the seat.

10. The storage space for a motorcycle according to claim 9, wherein said air chamber is formed in said space.

11. The storage space for a motorcycle according to claim 10, wherein said intake passage extends into said space and is connected to said air chamber.

12. The storage space for a motorcycle according to claim 9, wherein the air cleaner is formed in said space below said seat.

13. The storage space for a motorcycle according to claim 9, wherein the positioning of the cylinder of the engine to extend forwardly enlarges the space below the seat for increasing the size of said housing box.

14. The storage space for a motorcycle according to claim 9, wherein said intake passage includes an intake port, an inlet pipe and a throttle valve extending rearwardly from the cylinder of the engine.

* * * * *